United States Patent
Luo et al.

(10) Patent No.: US 12,302,444 B2
(45) Date of Patent: May 13, 2025

(54) METHOD AND DEVICE FOR SIDELINK COMMUNICATION

(71) Applicant: ZTE Corporation, Shenzhen (CN)

(72) Inventors: Wei Luo, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 320 days.

(21) Appl. No.: 17/875,694

(22) Filed: Jul. 28, 2022

(65) Prior Publication Data

US 2022/0408514 A1    Dec. 22, 2022

Related U.S. Application Data

(63) Continuation of application No. PCT/CN2020/075075, filed on Feb. 13, 2020.

(51) Int. Cl.
*H04W 76/28* (2018.01)
*H04W 72/25* (2023.01)
*H04W 92/18* (2009.01)

(52) U.S. Cl.
CPC .......... *H04W 76/28* (2018.02); *H04W 72/25* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 11,751,141 B2 * | 9/2023 | Wu | H04W 72/20 370/311 |
| 2019/0053305 A1 | 2/2019 | Saiwai et al. | |
| 2019/0090198 A1 | 3/2019 | Zhao | |
| 2019/0215897 A1 * | 7/2019 | Babaei | H04W 76/28 |
| 2020/0163103 A1 * | 5/2020 | Kuang | H04W 72/23 |
| 2022/0361284 A1 * | 11/2022 | Liu | H04W 52/0216 |
| 2022/0377833 A1 * | 11/2022 | Dimou | H04W 72/23 |

(Continued)

FOREIGN PATENT DOCUMENTS

| | | |
|---|---|---|
| CN | 105122858 A | 12/2015 |
| CN | 108307486 A | 7/2018 |

(Continued)

OTHER PUBLICATIONS

Indian First Examination Report issued Jan. 27, 2023 in corresponding Indian Patent Application No. 202217041793.

(Continued)

*Primary Examiner* — Christopher M Crutchfield
(74) *Attorney, Agent, or Firm* — Crowell & Moring LLP

(57) ABSTRACT

This disclosure relates to methods and devices for sidelink communication between user equipments in a wireless communication network. In one implementation, the method may include receiving an discontinuous reception configuration assistant information. The method may further include determining a discontinuous reception configuration scheme for a sidelink communication between the first user equipment and a second user equipment based on the discontinuous reception configuration assistant information. The method may further include performing a sidelink discontinuous reception of the sidelink communication according to the discontinuous reception configuration scheme.

20 Claims, 2 Drawing Sheets

(56) References Cited

U.S. PATENT DOCUMENTS

| | | | | |
|---|---|---|---|---|
| 2023/0088615 A1* | 3/2023 | Zhao | ............... | H04W 52/0229 370/311 |
| 2023/0107246 A1* | 4/2023 | Kang | ............... | H04W 52/02 370/329 |
| 2024/0097827 A1* | 3/2024 | Lee | ............... | H04W 4/08 |

FOREIGN PATENT DOCUMENTS

| | | | |
|---|---|---|---|
| CN | 108307489 A | | 7/2018 |
| CN | 202010072805 | * | 1/2020 |
| CN | 202010085307 | * | 10/2020 |
| EP | 3 996 426 A1 | | 5/2022 |
| EP | 4 094 539 | | 11/2022 |
| GB | 2555662 A | | 5/2018 |
| JP | 2019-525607 | | 9/2019 |
| KR | 10-2020-0013960 | * | 2/2020 |
| WO | WO 2011038775 A1 | | 4/2011 |
| WO | WO2017/138378 | | 8/2017 |
| WO | 2018/016882 | | 1/2018 |
| WO | WO 2018016882 A1 | | 1/2018 |
| WO | 2018/037317 | | 3/2018 |
| WO | 2018/064477 | | 4/2018 |
| WO | WO2021/147011 A1 | | 7/2021 |

OTHER PUBLICATIONS

Japanese Notice of Reasons for Rejection issued Jul. 11, 2023 in corresponding Japanese Patent Application No. 2022-545072 with English translation.

Australian Office Action issued May 22, 2023 in corresponding Australian Patent Application No. 2020385200.

International Search Report issued Nov. 5, 2020 in International (PCT) Application No. PCT/CN2020/075075.

Written Opinion ofthe International Searching Authority issued Nov. 5, 2020 in International (PCT) Application No. PCT/CN2020/075075.

Office action in Chinese application No. 202080095300.6, dated Aug. 15, 2024, 20 pages (with English translation).

Office action issued in Canadian application No. 3,163,546, dated Nov. 12, 2024, 3 pages.

Extended European Search Report Issued May 2, 2023 In corresponding European Patent Application No. 20886670.7.

* cited by examiner

METHOD AND DEVICE FOR SIDELINK COMMUNICATION

This application is a continuation application of PCT International Application No. PCT/CN2020/075075, filed with the China National Intellectual Property Administration, PRC on Feb. 13, 2020, which is herein incorporated by reference in its entirety.

TECHNICAL FIELD

This disclosure is directed generally to wireless communications and particularly to sidelink communication between communication terminals including vehicles.

BACKGROUND

Sidelink is a unilateral wireless communication service, i.e., the communication between the communication terminals. Vehicle networking refers to a large scale system for wireless communication and information exchange among vehicles, pedestrians, roadside equipments, and internet in accordance with agreed communication protocols and data exchange standards. The vehicle networking communications enable the vehicles to gain driving safety, improve traffic efficiency, and acquire convenience or entertainment information. The vehicle networking communication may be categorized into three types as per the objects of wireless communication: the communication between vehicles, i.e., vehicle-to-vehicle (V2V); the communication between vehicles and roadside equipments/network infrastructures, i.e., vehicle-to-infrastructure/vehicle-to-network (V2I/V2N); and the communication between vehicles and pedestrians, i.e., vehicle-to-pedestrian (V2P). These types of communications collectively are referred to as vehicle-to-everything (V2X) communication.

In the V2X communication research of 3rd Generation Partnership Project (3GPP), the sidelink based V2X communication between user equipments is one of the manners to implement the V2X standard, in which traffic data is directly transmitted from a source user equipment to a destination user equipment via an air interface without forwarding by the base station and the core network, as shown in FIG. 1. This V2X communication is referred to as PC5-based V2X communication or V2X sidelink communication.

With the technology advancement and development of the automation industry, the scenarios for V2X communications are further diversified and require higher performance. The advanced V2X services include vehicle platooning, extended sensors, advanced driving (semi-automated driving and full-automated driving), and remote driving. The desired performance requirements may include: supporting data packet with the size of 50 to 12000 bytes, transmission rate with 2 to 50 messages per second, the maximum end-to-end delay of 3 to 500 milliseconds, reliability of 90% to 99.999%, data rate of 0.5 to 1000 Mbps, as well as transmission range of 50 to 1000 meters.

SUMMARY

This disclosure is directed to methods, systems, and devices related to wireless communication, and more specifically, for sidelink communication between communication terminals to save the power of the communication terminals.

In one embodiment, a method performed by a first user equipment in a wireless communication network is disclosed. The method may include receiving a discontinuous reception configuration assistant information. The method may further include determining a discontinuous reception configuration scheme for a sidelink communication between the first user equipment and a second user equipment based on the discontinuous reception configuration assistant information. The method may further include performing a sidelink discontinuous reception of the sidelink communication according to the discontinuous reception configuration scheme.

In another embodiment, a device for wireless communication may include a memory storing instructions and a processing circuitry in communication with the memory. When the processing circuitry executes the instructions, the processing circuitry is configured to carry out the above method.

In another embodiment, a computer-readable medium comprising instructions which, when executed by a computer, cause the computer to carry out the above method.

The above and other aspects and their implementations are described in greater detail in the drawings, the descriptions, and the claims below.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
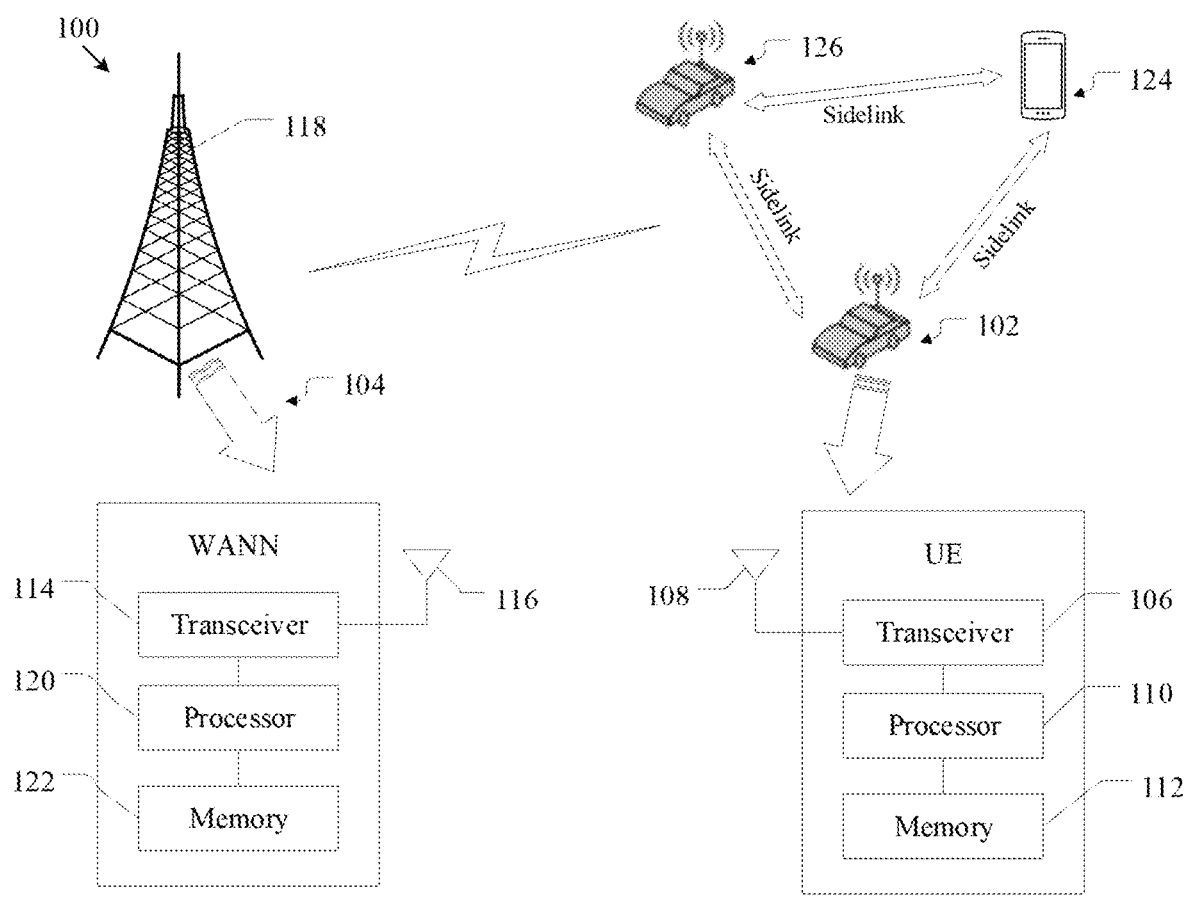
FIG. 1 illustrates an example diagram of a wireless communication network in accordance with various embodiments.

A wireless access network provides network connectivity between a user equipment (UE) and an information or data network such as a text, voice or video communication network, the Internet, and the like. An example wireless access network may be based on cellular technologies, which may further be based on, for example, 4G LTE or 5G NR technologies and/or formats. FIG. 1 shows an example system diagram of wireless communication network 100 including UEs 102, 124, and 126 as well as a wireless access network node (WANN) 104 according to various embodiments. The UEs 102, 124, and 126 may include but is not limited to a mobile phone, smartphone, tablet, laptop computer, a vehicle on-board communication equipment, roadside communication equipment, a smart electronics or appliance including an air conditioner, a television, a refrigerator, an oven, or other devices that are capable of communicating wirelessly over a network. The UEs may directly communicate with each other via the sidelinks. Take the UE 102 as example, it may include transceiver circuitry 106 coupled to an antenna 108 to effect wireless communication with the wireless access network node 104. The transceiver circuitry 106 may also be coupled to a processor 110, which may also be coupled to a memory 112 or other storage devices. The memory 112 may store therein instructions or code that, when read and executed by the processor 110, cause the processor 110 to implement various ones of the methods described herein.

Similarly, the wireless access network node 104 may comprise a base station or other wireless network access points capable of communicating wirelessly over a network with one or more UEs. For example, the wireless access network node 104 may comprise a 4G LTE base station, a 5G NR base station, a 5G central-unit base station, or a 5G distributed-unit base station. Each type of these wireless access network nodes may be configured to perform a corresponding set of wireless network functions. The set of wireless network functions between different types of wireless access network nodes may not be identical. The set of wireless network functions between different types of wireless access network nodes, however, may functionally overlap. The wireless access network node 104 may include transceiver circuitry 114 coupled to an antenna 116, which may include an antenna tower 118 in various approaches, to effect wireless communication with the UEs 102, 124, and 126. The transceiver circuitry 114 may also be coupled to one or more processors 120, which may also be coupled to a memory 122 or other storage devices. The memory 122 may store therein instructions or code that, when read and executed by the processor 120, cause the processor 120 to implement various ones of the methods described herein.

For simplicity and clarity, only one WANN and three UEs are shown in the wireless communication network 100. It will be appreciated that one or more WANNs may exist in the wireless communication network, and each WANN may serve one or more UEs in the meantime. Besides UEs and WANNs, the network 100 may further comprise any other network nodes with different functions such as the network nodes in core network of the wireless communication network 100. In addition, while various embodiments will be discussed in the context of the particular example wireless communication network 100, the underlying principle applies to other applicable wireless communication networks.

In the sidelink communication such as V2X communication between UEs, the UEs need to monitor the sidelink signals within the entire range of sidelink receive resource pool, which incurs huge power consumption and low efficiency. One of the objectives of the present disclosure is to reduce the power consumption of the sidelink communication while meeting the time delay requirements.

Figure 2:
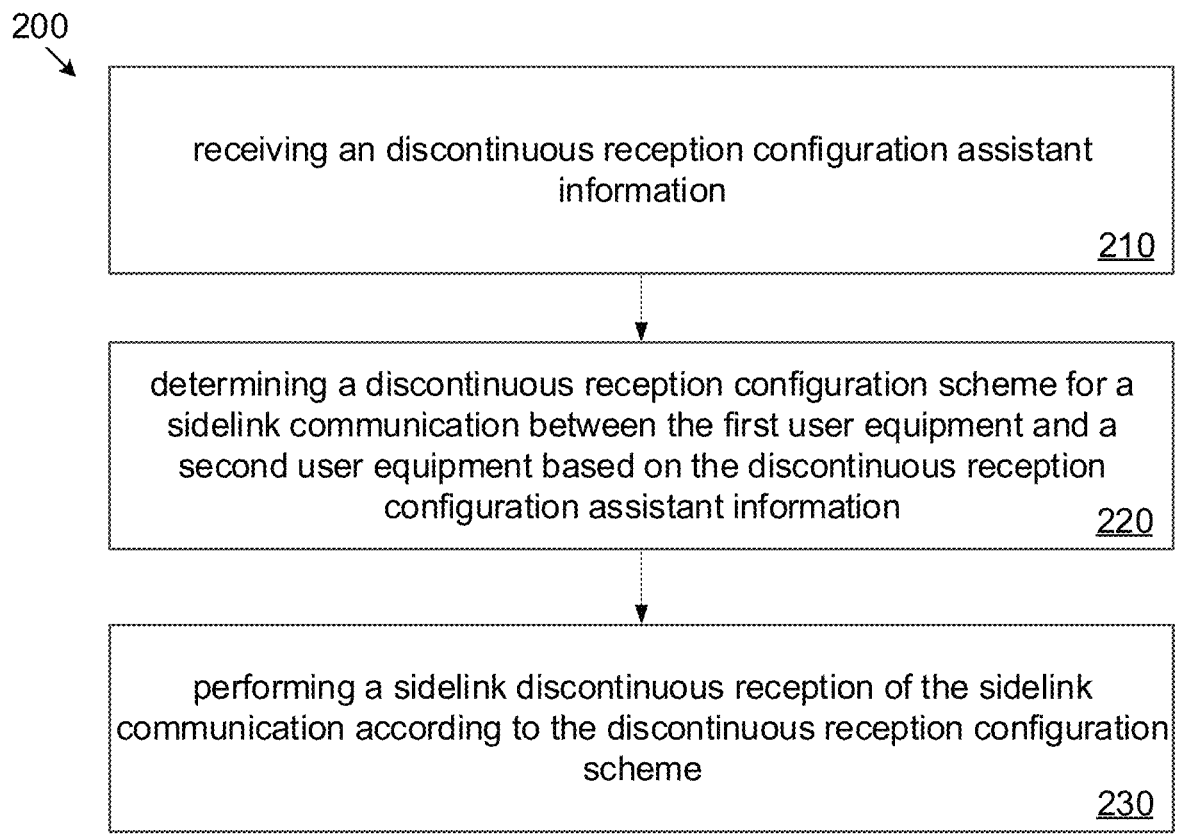
FIG. 2 illustrates a flow diagram of a method for sidelink communication in accordance with an embodiment.

FIG. 2 illustrates an exemplary implementation 200 for sidelink communication of the user equipments. The UE 102 may receive a discontinuous reception (DRX) configuration assistant information (210), determine a DRX configuration scheme for a sidelink communication between the UE 102 and the UE 124 based on the DRX configuration assistant information (220), and perform a sidelink discontinuous reception of the sidelink communication according to the DRX configuration scheme (230). The discontinuous reception configuration scheme may indicate a reception on duration and/or a reception off duration. In this way, the UE 102 may monitor physical sidelink control channel (PSCCH) to receive the sidelink communication only at time domain intersection between the reception on duration and a sidelink reception resource pool for the sidelink communication.

Next, various detailed embodiments will be discussed with reference to FIGS. 1 and 2 to set forth the technical solutions in the present disclosure.

First Embodiment

The UE 102 may receive the DRX configuration assistant information from a wireless access network node such as the WANN 104 (210). The DRX configuration assistant information may include, for example, recommended sidelink DRX configuration information, sidelink transmit resource pool information, sidelink receive resource pool information, and sidelink DRX configuration information of other UEs. The sidelink DRX configuration information of the other UEs may include, for example, a traffic type in the sidelink communication and corresponding DRX configuration parameters. The traffic type may be represented by a destination identifier, a destination identifier index, a destination UE identifier, or a destination UE identifier index. The destination identifier and destination identifier index may refer to a type of sidelink traffic without differentiating the transmit UEs. The destination UE identifier and the destination UE identifier index may refer to a type of sidelink traffic transmitted from a specific UE. Examples of various types of traffic may include safe driving information, road traffic information, entertaining information, and the like.

The UE 102 may receive the sidelink DRX configuration assistant information from the WANN 104 via a radio resource control (RRC) dedicated message. Alternatively, the UE 102 may receive the sidelink DRX configuration assistant information from the WANN 104 via a broadcast message.

After receiving the DRX configuration assistant information from the WANN 104 (210), the UE 102 may determine the DRX configuration scheme for the sidelink communication between the UE 102 and the UE 124 based on the DRX configuration assistant information (220). The DRX configuration scheme may include at least one set of DRX configuration parameters. A set of DRX configuration parameters may include, for example, a sidelink DRX cycle, a time duration, an on duration time pattern, a first non-active timer, and a second non-active timer. The on duration time pattern may include a slot bitmap indicating the sidelink DRX on duration, which will be discussed in detail later.

Specifically, the UE 102 may utilize the DRX configuration assistant information as reference to determine or update its DRX configuration parameters for the sidelink communication on its own, and then apply the determined/updated DRX configuration parameters to the DRX configuration scheme for the sidelink communication.

Once the sidelink DRX configuration scheme is set, the UE 102 does not have to continuously monitor the PSCCH. Instead, the UE 102 may only monitor the PSCCH during the reception on duration. But it may still monitor other physical layer channels anytime.

Optionally, before receiving the DRX configuration assistant information from the WANN 104, the UE 102 may transmit to the WANN 104 a DRX configuration assistant information request message, which may include, for example, a destination identifier, a destination user equipment identifier list, and a transmission manner. The transmission manner may include, for example, unicast, multicast, and broadcast.

In some implementation, through the DRX configuration assistant information request message, the WANN 104 may be aware of the traffic types that the UE 102 has interest in monitoring and receiving, and then merely transmits the DRX configuration assistant information related to the interested traffic types to the UE 102.

Optionally, before receiving the DRX configuration assistant information from the WANN 104, the UE 102 may transmit to the WANN 104 a capability information indicating whether the UE 102 supports sidelink discontinuous reception, a user equipment state information, and/or a quality of service requirement. The UE state information may include, for example, a pedestrian UE, a non-pedestrian UE, a UE with power saving requirement, a UE without power saving requirement, and a level of power saving. The quality of service requirement may include, for example, time delay, reliability, traffic priority, error rate, quality of service identifier, and quality of service flow identifier.

The WANN 104 may, for example, determine whether to transmit the DRX configuration assistant information to the UE 102 based on the capability information. For another example, the WANN 104 may determine the DRX configuration assistant information such as recommended sidelink DRX configuration scheme based on the user equipment state information and/or the quality of service requirement.

Second Embodiment

The UE 102 may receive the DRX configuration assistant information from another UE such as the UE 124 (210). The DRX configuration assistant information may include, for example, recommended sidelink DRX configuration information, semi-persistent schedule (SPS) assistant information, sidelink transmit resource pool information, sidelink receive resource pool information, power saving requirement, quality of service information, and a sidelink control information indicating a retransmission interval or a resource reservation period.

The UE 102 may receive the DRX configuration assistant information from the UE 124 via a unicast sidelink RRC message, a multicast sidelink RRC message, or a broadcast sidelink RRC message.

After receiving the DRX configuration assistant information from the UE 124 (210), the UE 102 may determine the DRX configuration scheme for the sidelink communication between the UE 102 and the UE 124 based on the DRX configuration assistant information (220). The DRX configuration scheme may include at least one set of DRX configuration parameters. A set of DRX configuration parameters may include, for example, a sidelink DRX cycle, a time duration, an on duration time pattern, a first non-active timer, and a second non-active timer.

Specifically, the UE 102 may utilize the DRX configuration assistant information as reference to determine or update its DRX configuration parameters for the sidelink communication on its own, and then apply the determined/updated DRX configuration parameters to determine the DRX configuration scheme for the sidelink communication.

Once the sidelink DRX configuration scheme is set, the UE 102 does not have to continuously monitor the PSCCH. Instead, the UE 102 may only monitor the PSCCH during the reception on duration.

Optionally, after receiving the sidelink DRX configuration assistant information transmitted from the UE 124, the UE 102 may transmit the sidelink DRX configuration assistant information to the WANN 104. Alternatively or additionally, the UE 102 may transmit both the sidelink DRX configuration assistant information and an identification of the UE 124 to the WANN 104. The identification of the UE 124 may be represented by a destination UE identifier, a destination UE identifier index, a destination identifier, or a destination identifier index.

Third Embodiment

By way of examples, this embodiment will discuss determining the DRX configuration scheme based on the DRX configuration assistant in different scenarios.

Scenario 1: The UEs are in Unicast Sidelink Communication

In this scenario, the UEs in communication, such as the UE 102 and the UE 124, may establish a sidelink RRC connection. The transmit UE such as the UE 124 may transmit the SPS assistant information to the receive UE such as the UE 102 based on the transmit resource pool and traffic arrival cycle of the UE 124. In some implementation, the transmit UE may merely transmit the SPS assistant information related to the receive UE. As such, the receive UE may determine the sidelink DRX configuration parameters based on the received SPS assistant information. For example, the receive UE may derive the arrival timing of the data packet from the SPS assistant information.

Alternatively or additionally, the transmit UE may transmit recommended sidelink DRX configuration information to the receive UE based on its predicted arrival pattern of the transmission service. If the receive UE has unicast connections with multiple transmit UEs, it may receive different DRX configuration recommendations from the multiple transmit UEs. Then, the receive UE may make use of these DRX configuration recommendations as reference to determine the sidelink DRX configuration parameters on its own.

Scenario 2: The UEs are in Multicast Communication

In this scenario, the transmit UE may transmit the SPS assistant information to the receive UE via multicast messages based on the transmit resource pool and traffic arrival cycle of the transmit UE. In some implementation, the transmit UE may merely transmit the SPS assistant information related to the receive UE. As such, the receive UE may determine the sidelink DRX configuration parameters based on the received SPS assistant information. For example, the receive UE may derive the arrival timing of the data packet from the SPS assistant information.

Alternatively or additionally, the transmit UE may transmit recommended sidelink DRX configuration information to the receive UE via multicast message based on its predicted arrival pattern of the transmission service. If the receive UE is communicating with multiple transmit UEs, it may receive different DRX configuration recommendations from the multiple transmit UEs. Then, the receive UE may make use of these DRX configuration recommendations as reference to determine the sidelink DRX configuration parameters on its own.

To the end, multicast sidelink RRC connections may be established for exchanging the information. Alternatively, the UEs may separately establish unicast connections with each other for the transmission of the sidelink DRX related configuration information.

Scenario 3: The UEs are in Broadcast Communication

In this scenario, the transmit UE may transmit the SPS assistant information to the receive UE via broadcast messages based on the transmit resource pool and traffic arrival cycle of the transmit UE. In some implementation, the transmit UE may merely transmit the SPS assistant information related to the receive UE. As such, the receive UE may determine the sidelink DRX configuration parameters based on the received SPS assistant information. For example, the receive UE may derive the arrival timing of the data packet from the SPS assistant information.

Alternatively or additionally, the transmit UE may transmit recommended sidelink DRX configuration information to the receive UE via broadcast messages based on its predicted arrival pattern of the transmission service. If the receive UE is communicating with multiple transmit UEs, it may receive different DRX configuration recommendations from the multiple transmit UEs. Then, the receive UE may make use of these DRX configuration recommendations as reference to determine the sidelink DRX configuration parameters on its own.

To the end, a sidelink broadcast RRC message may be defined for exchanging the information. Alternatively, the UEs may exchange the information via a sidelink signaling such as network protocol messages (NAS messages). The subframes between the UEs should be aligned after exchanging the information.

Fourth Embodiment

By way of examples, this embodiment will discuss using slot bitmap to indicate on duration time pattern in the DRX configuration parameters.

A slot bitmap may indicate which slots or symbols are sidelink reception resources in the sidelink resource pool. In some implementation, the sidelink DRX cycle is configured, which may be an integral multiple of the cycle of the sidelink reception resource pool, i.e. the length of the slot bitmap. Alternatively, the cycle of the sidelink reception resource pool may be an integral multiple of the sidelink DRX cycle. Accordingly, the reception on duration may be configured as the number of slots within the sidelink resource pool after the beginning of a DRX cycle.

Similarly, a slot bitmap may indicate which slots are configured to be reception on or reception off within the range of the indicated transmission resources. In some implementation, the sidelink DRX bitmap is configured. For example, there are ten slots within a cycle of the sidelink resource pool, and the slots 1, 2, 6, 7, 9 serve as the sidelink reception resource pool. On the basis of the five slots, a sidelink DRX bitmap may be used to indicate which of them are reception on duration slots. In particular, because the number of slots for sidelink reception is five within a cycle of sidelink resource pool, the cycle of the side DRX bitmap can be configured to be five. The sidelink DRX bitmap may, for example, be [1, 0, 1, 0, 1], which means that the DRX is on in the slots 1, 6, and 9 and the DRX is off in the slots 2 and 7. In the similar fashion, the DRX is on in the slots of 11, 16, 19, 21, 26, 29 . . . and the DRX is off in the slots of 12, 17, 22, 27, . . . .

Optionally, the cycle of the sidelink DRX bitmap may be longer than the cycle of the sidelink resource pool. As such, the parameter sidelink DRX cycle can be configured to be integral N multiple of the cycle of the sidelink reception resource pool. If N is 2, then the cycle of the side DRX bitmap equals ten (2*5). As an example, the side DRX bitmap may be [1, 0, 1, 0, 1, 1, 0, 0, 0, 1], which means that the DRX is on in the slots 1, 6, 9, 11, 19 and the DRX is off in the slots 2, 7, 12, 16, 17.

Fifth Embodiment

By way of examples, this embodiment will discuss that the UE 102 may be configured with multiple DRX configuration schemes, each of which may have a set of sidelink DRX configuration parameters.

In some implementation, the multiple DRX configuration schemes may be configured as per different destination UEs. In particular, the DRX on duration pattern may be customized for different destination UEs. For example, the UE 102 establishes sidelink connections with both the UE 124 and the UE 126. The UE 124 and the UE 126 have completely different transmission resource pool configuration, and thus the resource positions to be monitored may be different. In this case, two DRX configuration schemes may be configured for the UE 102 to respectively adapt to the different resource positions to be monitored.

In another implementation, the multiple DRX configuration schemes may be configured as per different sidelink reception resource pool configurations. For example, if the UE 102 are configured with multiple reception resource pools, the multiple DRX configuration schemes may correspond to these reception resource pools respectively.

Sixth Embodiment

By way of examples, this embodiment will discuss reporting the measured sidelink channel state information (CSI) by the UE 102 in the context that the UE 102 is configured with the DRX configuration scheme.

Specifically, the UE 102 may receive a sidelink CSI report configuration information comprising a CSI report masking from, for example, the UE 124. The CSI report masking may indicate whether to delay reporting a sidelink channel state indication until a sidelink active time. The reception on/off duration set in the DRX configuration scheme may define the sidelink active/inactive time for the UE 102. Where the CSI report masking indicates that the delay is required, the UE 102 may delay reporting the sidelink CSI until the sidelink active time defined by the DRX configuration scheme. Thus, if the UE is configured with a sidelink DRX, the most recent CSI measurement timing may occur in the sidelink DRX active time for CSI to be reported.

Seventh Embodiment

In the context of sidelink communication, the sidelink control information (SCI) of the transmit UE may carry a SPS period or retransmission interval or the resource reservation period. At the next cycle indicated by the SPS period or at the retransmission position indicated by the retransmission interval or the resource reservation period, it is possible that the receive UE is in DRX off state, i.e., inactive state. This is the case when the transmit UE does not know the DRX configuration scheme of the receive UE. The problem is whether the receive UE may receive the sidelink communication at the next new transmission or retransmission position despite that it is in DRX off state.

One option is the UE has to wake up at the next new transmission or retransmission position indicated by the SCI regardless of the DRX off state. In this case, because of receiving the SCI, it is likely that the retransmission may take place, which may also trigger the restart of timers the drx-RetransmissionTimerSL and the drx-HARQ-RTT-TimerSL.

Another option is to not change the regulation in the DRX configuration scheme. As such, the receive UE may not receive the SCI message during its DRX reception off duration. But it may receive message from the physical sidelink share channel (PSSCH) resources indicated by the previous SCI. This option is applicable to the broadcast scenario without feedback.

A further option is to restrict the configurations of the DRX and SPS. For example, it is required that the duration of the timer drx-InactivityTimer has to be longer than the maximum SPS cycle.

In some implementation, if the transmit UE may estimate the time for next transmission and the receive UE only has interest in the current traffic in transmission, a SPS related timer may be introduced. For example, when the receive UE receives a SCI indicating a retransmission interval or the resource reservation period from the transmit UE, the receive UE may start the SPS silence timer with a timer duration equal to the retransmission interval or the resource reservation period, during which the receive UE is in DRX off state for the related process. Upon the expiration of the SPS silence timer, the receive UE may start a SPS active timer for the related process and switch to DRX on state, i.e., active state, until the SPS active timer expires regardless of the DRX configuration scheme. The duration of the SPS active timer is configurable within a duration range.

Optionally, the receive UE may receive the SPS active timer configuration information and/or the SPS silence timer configuration information before receiving the DRX configuration assistant information. The SPS active timer configuration information may indicate a duration of the SPS active timer and the SPS silence timer configuration information may indicate a duration of the SPS silence timer.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a first user equipment in a wireless communication network, comprising:
   receiving a discontinuous reception configuration assistant information;
   determining a discontinuous reception configuration parameter for a sidelink communication between the first user equipment and a second user equipment based on the discontinuous reception configuration assistant information;
   applying the discontinuous reception configuration parameter to a discontinuous reception configuration scheme for the sidelink communication; and
   in response to receiving, from the second user equipment, a sidelink control information including a retransmission interval or a resource reservation period, waking up the first user equipment at a next new transmission or retransmission position indicated by the sidelink control information.

2. The method of claim 1, further comprising:
   performing a sidelink discontinuous reception of the sidelink communication according to the discontinuous reception configuration scheme.

3. The method of claim 1, wherein the discontinuous reception configuration scheme comprises one or more sets of discontinuous reception configuration parameters, each of the one or more sets of discontinuous reception configuration parameters comprises at least one of a sidelink discontinuous reception cycle, a time duration, an on duration time pattern, a first non-active timer, and a second non-active timer.

4. The method of claim 1, wherein the receiving the discontinuous reception configuration assistant information comprises:
   receiving a first discontinuous reception configuration assistant information from the second user equipment and a second discontinuous reception configuration assistant information from a third user equipment; and
   the determining the discontinuous reception configuration scheme comprises:
   determining the discontinuous reception configuration scheme based on the first discontinuous reception configuration assistant information and the second discontinuous reception configuration assistant information.

5. The method of claim 1, wherein the discontinuous reception configuration assistant information comprises expected sidelink discontinuous reception configuration information.

6. The method of claim 1, wherein the receiving the discontinuous reception configuration assistant information comprises:
   receiving the discontinuous reception configuration assistant information from the second user equipment.

7. The method of claim 6, wherein the discontinuous reception configuration assistant information is received from the second user equipment via a unicast sidelink radio resource control message.

8. The method of claim 6, wherein the discontinuous reception configuration assistant information is received from the second user equipment, the method further comprises:
reporting the discontinuous reception configuration assistant information to a wireless access node.

9. The method of claim 8, further comprising:
transmitting an identification of the second user equipment to the wireless access node.

10. The method of claim 9, wherein the identification of the second user equipment comprises a destination user equipment identifier.

11. The method of claim 8, further comprising:
transmitting, to the wireless access node, at least one of a capability information indicating whether the first user equipment supports sidelink discontinuous reception, a user equipment state information, and a quality of service requirement.

12. The method of claim 11, wherein the user equipment state information comprises at least one of a pedestrian user equipment, a non-pedestrian user equipment, a user equipment with power saving requirement, a user equipment without power saving requirement, and a level of power saving.

13. The method of claim 11, wherein the quality of service requirement comprises at least one of time delay, reliability, traffic priority, and error rate, quality of service identifier, quality of service flow identifier.

14. The method of claim 2, further comprising:
receiving a sidelink channel state indication report configuration information comprising a channel state indication report masking indicating whether to delay reporting a sidelink channel state indication until a sidelink active time; and
in response to the delay being indicated, delaying reporting the sidelink channel state indication until the sidelink active time defined by the discontinuous reception configuration scheme.

15. The method of claim 1, further comprising:
in response to receiving, from the second user equipment, a sidelink control information indicating a retransmission interval or a resource reservation period, starting a semi-persistent schedule silence timer with a timer duration equal to the retransmission interval or a resource reservation period, during which the first user equipment is in inactive state; and
in response to the semi-persistent schedule silence timer expiring, starting a semi-persistent schedule active timer and switching the first user equipment to active state, until the semi-persistent schedule active timer expires.

16. The method of claim 15, further comprising:
before receiving the discontinuous reception configuration assistant information, receiving a semi-persistent schedule active timer configuration information indicating a duration of the semi-persistent schedule active timer, or a semi-persistent schedule silence timer configuration information indicating a duration of the semi-persistent schedule silence timer.

17. A device comprising:
a memory operable to store computer-readable instructions; and
a processor circuitry operable to read the computer-readable instructions, the processor circuitry when executing the computer-readable instructions is configured to:
receive a discontinuous reception configuration assistant information;
determine a discontinuous reception configuration parameter for a sidelink communication between a first user equipment and a second user equipment based on the discontinuous reception configuration assistant information;
apply the discontinuous reception configuration parameter to a discontinuous reception configuration scheme for the sidelink communication; and
in response to receiving, from the second user equipment, a sidelink control information including a retransmission interval or a resource reservation period, wake up the first user equipment at a next new transmission or retransmission position indicated by the sidelink control information.

18. The device of claim 17, wherein the processor circuitry is configured to:
receive the discontinuous reception configuration assistant information from the second user equipment.

19. The device of claim 17, wherein the processor circuitry is further configured to:
transmit an identification of the second user equipment to a wireless access node, the identification of the second user equipment comprises a destination user equipment identifier.

20. A non-transitory machine-readable media, having instructions stored on the machine-readable media, the instructions configured to, when executed, cause a machine to:
receive a discontinuous reception configuration assistant information;
determine a discontinuous reception configuration parameter for a sidelink communication between a first user equipment and a second user equipment based on the discontinuous reception configuration assistant information;
apply the discontinuous reception configuration parameter to a discontinuous reception configuration scheme for the sidelink communication; and
in response to receiving, from the second user equipment, a sidelink control information including a retransmission interval or a resource reservation period, wake up the first user equipment at a next new transmission or retransmission position indicated by the sidelink control information.

* * * * *